(12) United States Patent
Balazs et al.

(10) Patent No.: US 9,027,094 B1
(45) Date of Patent: May 5, 2015

(54) ASSOCIATING DATA INITIALLY WITH DEVICES AND SUBSEQUENTLY WITH ACCOUNTS

(71) Applicant: Intuit Inc., Mountain View, CA (US)

(72) Inventors: Alex G. Balazs, San Diego, CA (US); George Gelly, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 160 days.

(21) Appl. No.: 13/753,225

(22) Filed: Jan. 29, 2013

(51) Int. Cl.
*G06Q 40/00* (2012.01)
*H04L 29/06* (2006.01)
*G06Q 20/32* (2012.01)

(52) U.S. Cl.
CPC ............ *H04L 63/10* (2013.01); *G06Q 20/3224* (2013.01); *G06Q 20/322* (2013.01)

(58) Field of Classification Search
CPC ....... G06Q 20/10; G06Q 20/32; G06Q 20/40; G06Q 20/322; G06Q 20/206; G06Q 20/3821; G06Q 20/4012; H04L 63/10
USPC ........... 726/1–5; 709/227; 705/21, 35–49, 67, 705/71, 72
See application file for complete search history.

(56) References Cited

U.S. PATENT DOCUMENTS

2004/0215788 A1* 10/2004 Morris .......................... 709/227
2009/0182674 A1* 7/2009 Patel et al. ...................... 705/72

* cited by examiner

*Primary Examiner* — Kambiz Zand
*Assistant Examiner* — Noura Zoubair
(74) *Attorney, Agent, or Firm* — Park, Vaughan, Fleming & Dowler LLP; Steven E. Stupp

(57) ABSTRACT

A technique for associating data with an account is described. During this technique, a user uploads data to a computer system from an electronic device one or more times without providing log-in credentials for the account. Instead, the data is stored along with an identifier determined from characteristics or attributes of the electronic device. If the user subsequently logs into the account from the electronic device, the computer system determines that the identifier for the electronic device matches the previously determined identifier. At this point, the computer system associates data with the account.

20 Claims, 4 Drawing Sheets

ASSOCIATING DATA INITIALLY WITH DEVICES AND SUBSEQUENTLY WITH ACCOUNTS

BACKGROUND

The present disclosure relates to a technique for associating data with an electronic device which uploaded the data instead of associated the data with a user account.

Many network-based software applications allow users to remotely access and manage their associated accounts. For example, a user may upload data to their account via a network. Typically, the user first provides log-in credentials for their account, such as their username and password. Then, after the user has been authenticated and authorized, they can access their account and upload the data.

However, log-in credentials that include a username and password are vulnerable to theft and, thus, constitute a security risk. Furthermore, providing log-in credentials can be time-consuming and, thus, frustrating for users. This is especially the case when the user repeatedly uploads data, or when the user attempts to access their account from a portable electronic device, which may have a small screen size and consequently a smaller user interface that is more difficult to use than a larger user interface of a desktop computer. Hence, the need to provide log-in credentials can degrade the user experience when the user accesses network-based software applications.

SUMMARY

The disclosed embodiments relate to a computer system that associates data with an account. During operation, the computer system receives data from a first electronic device, where the data is received without receiving log-in credentials for the account. Then, the computer system determines a first identifier for the first electronic device based on characteristics of the first electronic device. Next, the computer system stores the data and the first identifier. At a later time, the computer system receives the log-in credentials for the account from a second electronic device, and the computer system determines a second identifier for the second electronic device based on characteristics of the second electronic device. If the first identifier and the second identifier match, the computer system associates the data with the account.

Note that the data may include: an image of a financial document; sales information; and/or an image of a receipt. Moreover, the characteristics of a given electronic device, which can include one of the first electronic device and the second electronic device, may include: a type of web browser, a web-browser plugin, an ability to accept location headers in the web browser, a time zone, a screen size, a color depth, a system font, an ability to accept cookies, and/or a super-cookie test.

Furthermore, the account may be a pre-existing account. However, in some embodiments, after storing the data and the first identifier and before receiving the log-in credentials, the computer system optionally creates the account.

In some embodiments, the computer system may optionally use the data in an application (such as a software application) associated with the account.

Additionally, in some embodiments the data is received over time.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for associating data with an account, and a computer-program product (e.g., software) for use with the computer system are described. During this data-management technique, a user may upload data to a computer system from an electronic device one or more times without providing log-in credentials for the account. Instead, the data may be stored along with a unique identifier determined from characteristics or attributes of the electronic device. Subsequently, if the user logs into the account from the electronic device, the computer system may determine that the identifier for the electronic device matches the previously determined identifier. Then, the computer system may associate data with the account.

By allowing a user to upload data without providing log-in credentials for the account, and subsequently associating the user's account with the data so that it can be used, the data-management technique may make it easier for the user to provide the data. In particular, the data-management technique may allow the users to determine when they would like to log-in. The added convenience associated with the data-management technique may provide a unique user experience that increases customer satisfaction and, therefore, may increase the revenue of a provider of software applications that use the data-management technique. In some applications, the data-management technique may also provide a non-duplicatble identifier that can provide enhanced protection of user data.

In the discussion that follows, a user may include: an individual or a person (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
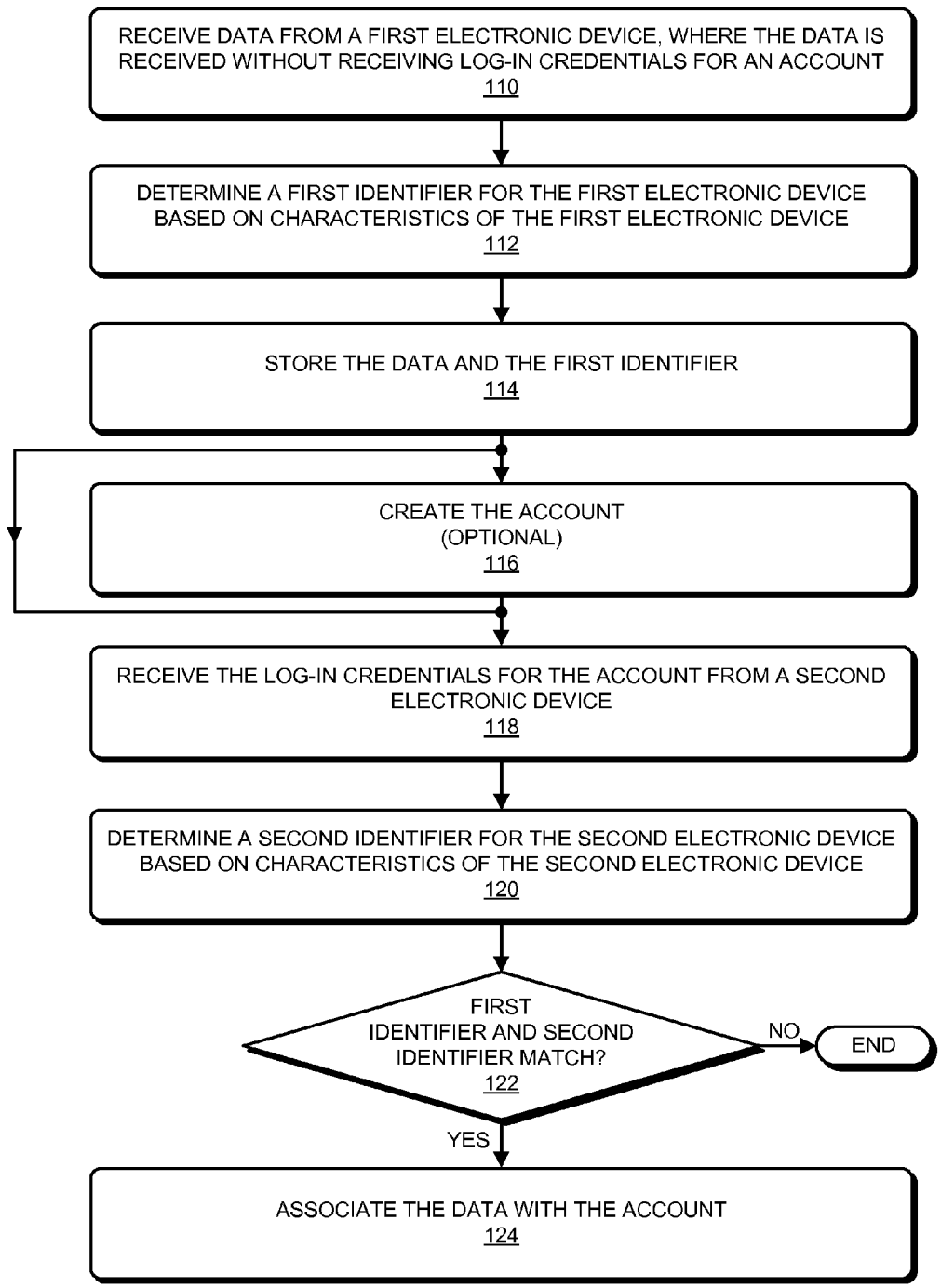
FIG. 1 is a flow chart illustrating a method for associating data with an account in accordance with an embodiment of the present disclosure.

We now describe embodiments of the data-management technique. FIG. 1 presents a flow chart illustrating a method 100 for associating data with an account, which may be performed by a computer system (such as computer system 400 in FIG. 4). During operation, the computer system receives data from a first electronic device, where the data is received without receiving log-in credentials for the account (operation 110). For example, the data may include: an image of a financial document (such as a W2 or a 1099 form); sales information; and/or an image of a receipt. This data may be associated with a software application (which is sometimes referred to as an 'application'), such as: income-tax software, financial planning software, accounting software, payroll or accounting software (which is capable of processing payroll information), software that processes financial information and/or a mobile-payment application (for example, an application that makes electronic payments from a portable electronic device).

Then, the computer system determines a first identifier for the first electronic device based on characteristics (or attributes) of the first electronic device (operation 112). For example, the characteristics of a given electronic device, which can include one of the first electronic device and the second electronic device, may include: a type of web browser, a web-browser plugin, an ability to accept location headers in the web browser, a time zone, a screen size, a color depth, a system font, an ability to accept cookies, and/or a super-cookie test. In general, combinations of the characteristics collected from a given electronic device, such as the first electronic device, are statistically unique so that it is very difficult (if not practically impossible) to reproduce without cloning the given electronic device and the content on the given electronic device. Therefore, a given identifier, such as the first identifier, may be unique.

Moreover, the computer system stores the data and the first identifier (operation 114), for example, in a computer-readable memory.

In some embodiments, the data is received over time. Therefore, operations 110-114 may occur two or more times over a time interval, such as: a week, a month, a quarter or a year. For example, a user may regularly upload sales receipts for subsequent use in preparing their income-tax return.

At a later time, the computer system receives the log-in credentials for the account from a second electronic device (operation 118). Next, the computer system determines a second identifier for the second electronic device based on characteristics of the second electronic device (operation 120). If the first identifier and the second identifier match (operation 122), the computer system associates the data with the account (operation 124). Thus, if the computer system determines that the first electronic device and what the computer system initially thought was a second electronic device are actually the same electronic device (based on the first and the second identifiers), the computer system associates the data with the account.

Note that the account may be a pre-existing account. However, in some embodiments, after storing the data and the first identifier (operation 114) and before receiving the log-in credentials (operation 118), the computer system optionally creates the account (operation 116). For example, the user may request that the account be created Furthermore, the computer system may optionally use the data in an application associated with the account. For example, as noted previously, the user associated with the account may use the data to prepare their income-tax return.

Figure 2:
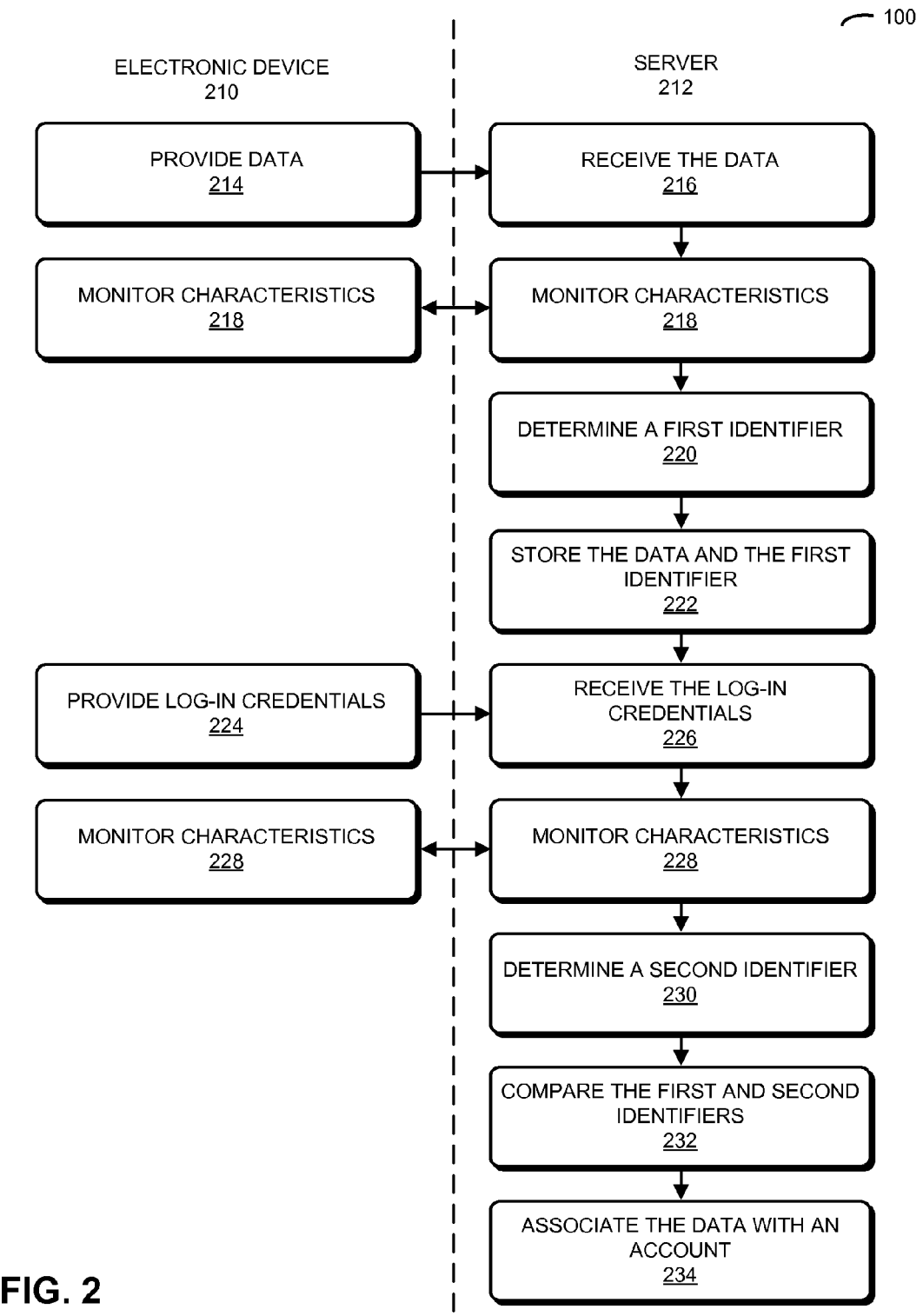
FIG. 2 is a flow chart illustrating the method of FIG. 1 in accordance with an embodiment of the present disclosure.

In an exemplary embodiment, the data-management technique is implemented using an electronic device (such as a computer or a portable electronic device, e.g., a cellular telephone) and at least one server, which communicate through a network, such as a cellular-telephone network and/or the Internet (e.g., using a client-server architecture). This is illustrated in FIG. 2, which presents a flow chart illustrating method 100 (FIG. 1).

During the method, electronic device 210 may provide data (operation 214), which is subsequently received by server 212 (operation 216). As noted previously, the data may be received without receiving log-in credentials for the account.

Then, server 212 may monitor characteristics (operation 218) of electronic device 210, and may determine a first identifier (operation 220) for electronic device 210 based on the characteristics of electronic device 210. Moreover, server 212 may store the data and the first identifier (operation 222).

At a later time, electronic device 210 may provide log-in credentials (operation 224) for the account, which are subsequently received by server 212 (operation 226). Next, server 212 may monitor characteristics (operation 228) of electronic device 210, and may determine a second identifier for electronic device 210 (operation 230) based on the characteristics of electronic device 210.

Server 212 may compare the first and the second identifiers (operation 232). If the first and the second identifiers match, server 212 may associate the data with the account (operation 234).

Furthermore, server 212 may optionally use the data in or with an application associated with the account.

In some embodiments of method 100 (FIGS. 1 and 2), there may be additional or fewer operations. Moreover, the order of the operations may be changed, and/or two or more operations may be combined into a single operation.

In an exemplary embodiment, the data-management technique uses an identifier associated with an electronic device to tie a user to an account for an improved user experience. In particular, the identifier associated with the electronic device may be used as a temporary placeholder for identification of the user (i.e., identification of the user can be delayed). This may simplify the operations the user needs to perform when interacting with a software application, such as when the user is uploading data.

For example, the user may know that in April they need to prepare their income taxes. This may involve the user using income-tax preparation software. During the year, however, the user may not want to use the income-tax preparation software. Instead, when they receive financial documents or information that they will need to prepare their income-tax return (such as sales receipts, bills, copies of travel expenses, mileage information, etc.), the user may wish to upload images of the financial documents for subsequent use.

As described below with reference to FIG. 3, in some embodiments the user may upload the financial documents using a software application that executes on or that is associated with the electronic device. This operation may be performed multiple times during the year. Each time, the user may upload one or more images without providing their log-in information for an account associated with the income-tax preparation software. Instead, characteristics of the electronic device may be monitored and used to determine an identifier for the electronic device. In addition, a temporary account for the uploaded information may be created for the electronic device (based on the identifier), as opposed to for the user.

Subsequently, if the user uses the electronic device to access their account (for example, by providing their log-in credentials), characteristics of the electronic device may be monitored and used to determine another identifier for the electronic device. Because this other identifier matches the previous identifiers determined for the electronic device, the uploaded information in the temporary account may be associated or linked with the user's account (and, thus, the user). This may allow the user to use the uploaded information, for example, when preparing their income-tax return.

In some embodiments, the association between the temporary account and the user's account based on the determined identifiers of the electronic device may be confirmed. For example, the user may be asked if they previously uploaded the information. If they answer yes, the association may be made, and the user may be able to use or access the uploaded information from their account.

In this way, the data-management technique may provide the user flexibility or choice as to when they provide log-in credentials and, more generally, as to when they identify themselves.

In an exemplary embodiment, the identifier associated with the electronic device may be based on consistent pieces of information, such as information related to the operating system or a web browser executing on the electronic device and/or the configuration of the electronic device. These consistent pieces of information may be requested or collected from the electronic device. For example, 10-12 characteristics or attributes of the electronic device may be monitored, and hashed with a key to create the identifier(s) for or associated with the electronic device (which is sometimes referred to as a 'digital signature'). In particular, the 10-12 characteristics or attributes of the electronic device may include: a type of web browser, a web-browser plugin, an ability to accept location headers in the web browser, a time zone, a screen size, a color depth, a system font, an ability to accept cookies, and/or a super-cookie test (such as a limited super-cookie test). In some embodiments, the frequencies of occurrence of the 10-12 characteristics or attributes of the electronic device may be used to determine the identifier(s).

We now describe embodiments of a system and the computer system, and their use. FIG. 3 presents a block diagram illustrating a system 300 that can be used, in part, to perform operations in method 100 (FIGS. 1 and 2). In this system, during the data-management technique a user of electronic device 210 may use a software product, such as a software application that is resident on and that executes on electronic device 210. (Alternatively, the user may interact with a web page that is provided by server 212 via network 312, and which is rendered by a web browser on electronic device 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on electronic device 210 (such as a software application that is provided by server 212 or that is installed and which executes on electronic device 210).

During the data-management technique, the user may use the software application to provide data (such as an image of a financial document) to server 212 via network 312. As noted previously, the data may be received without receiving log-in credentials for the user's account.

Then, server 212 may monitor characteristics of electronic device 210 via network 312, and may determine a first identifier for electronic device 210 based on the characteristics of electronic device 210. Moreover, server 212 may store the data and the first identifier.

At a later time, electronic device 210 may provide log-in credentials for the account to server 212 via network 312. Next, server 212 may monitor characteristics of electronic device 210 via network 312, and may determine a second identifier for electronic device 210 based on the characteristics of electronic device 210.

Server 212 may compare the first and the second identifiers. If the first and the second identifiers match, server 212 may associate the data with the account.

Furthermore, server 212 may optionally use the data in another software application, which may be associated with the account. This other software application may be the same as or different from the software application used to upload the data.

Note that information in system 300 may be stored at one or more locations in system 300 (i.e., locally or remotely). Moreover, because this data may be sensitive in nature, it may be encrypted. For example, stored data and/or data communicated via network 312 may be encrypted.

Figure 3:
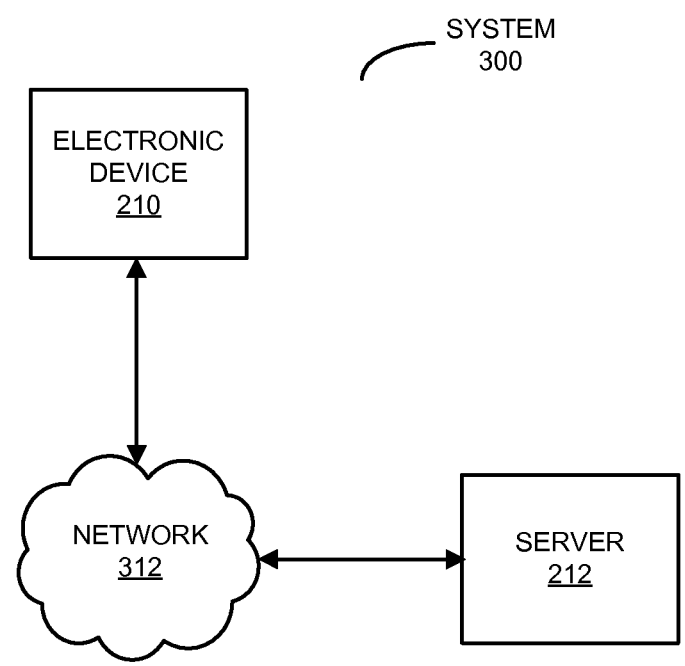
FIG. 3 is a block diagram illustrating a system that performs the method of FIGS. 1 and 2 in accordance with an embodiment of the present disclosure.
Figure 4:
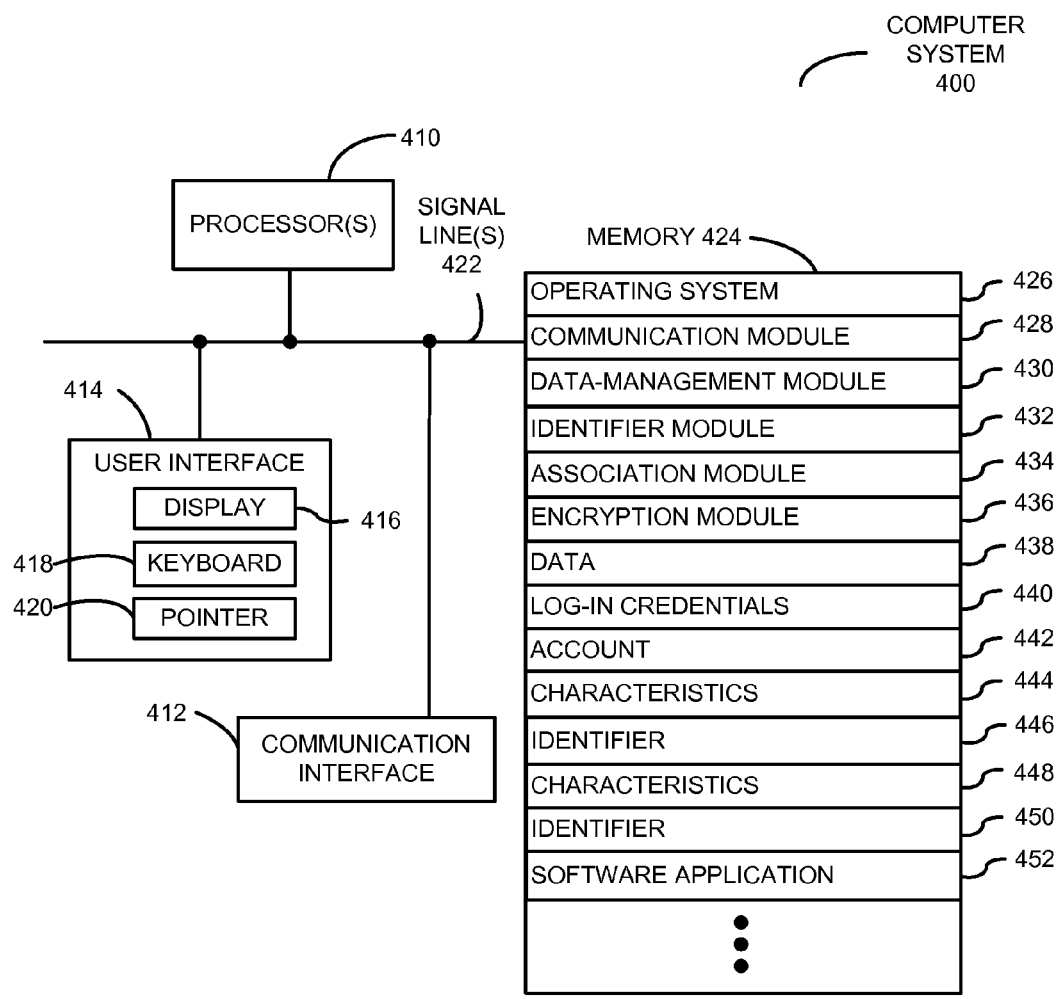
FIG. 4 is a block diagram illustrating a computer system that performs the method of FIGS. 1 and 2 in accordance with an embodiment of the present disclosure.

FIG. 4 presents a block diagram illustrating a computer system 400 that performs method 100 (FIGS. 1 and 2), such as server 212 (FIGS. 2 and 3). Computer system 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to computer system 400.

Memory 424 may also include multiple program modules (or sets of instructions), including: data-management module 430 (or a set of instructions), identifier module 432 (or a set of instructions), association module 434 (or a set of instructions), encryption module 436 (or a set of instructions), and/or software application 452 (or a set of instructions). Note that one or more of these program modules (or sets of instructions) may constitute a computer-program mechanism.

During the data-management technique, data-management module 430 may receive data 438 via communication module 428 and communication interface 412. As noted previously, data 438 may be received without receiving log-in credentials 440 for an account 442 of a user.

Then, identifier module 432 may monitor characteristics 444 of electronic device 210 (FIGS. 2 and 3) via communication module 428 and communication interface 412, and may determine identifier 446 for electronic device 210 (FIGS. 2 and 3) based on characteristics 444 of electronic device 210 (FIGS. 2 and 3). Moreover, data-management module 430 may store data 438 and first identifier 446 in memory 424.

At a later time, data-management module 430 may receive log-in credentials 440 for account 442 via communication module 428 and communication interface 412. Next, identifier module 432 may monitor characteristics 448 of electronic device 210 (FIGS. 2 and 3), and may determine identifier 450 for electronic device 210 (FIGS. 2 and 3) based on characteristics 448 of electronic device 210 (FIGS. 2 and 3).

Furthermore, association module 434 may compare identifier 446 and identifier 450. If identifier 446 and identifier 450 match, association module 434 may associate data 438 with account 442.

Additionally, data-management module 430 may optionally use data 438 with software application 452, which may be associated with account 442.

Because information used in the authentication technique may be sensitive in nature, in some embodiments at least some of the data stored in memory 424 and/or at least some of the data communicated using communication module 428 is encrypted or decrypted using encryption module 436.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although computer system 400 is illustrated as having a number of discrete items, FIG. 4 is intended to be a functional description of the various features that may be present in computer system 400 rather than a structural schematic of the embodiments described herein. In some embodiments, some or all of the functionality of computer system 400 may be implemented in one or more application-specific integrated circuits (ASICs) and/or one or more digital signal processors (DSPs).

Computer system 400, as well as electronic devices, computers and servers in system 400 (FIG. 4), may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 312 (FIG. 3) may include: the Internet, World Wide Web (WWW), an intranet, a cellular-telephone network, LAN, WAN, MAN, or a combination of networks, or other technology enabling communication between computing systems.

Electronic device 210 (FIGS. 2 and 3), server 212 (FIGS. 2 and 3), system 300 (FIG. 3), and/or computer system 400 may include fewer components or additional components. Moreover, two or more components may be combined into a single component, and/or a position of one or more components may be changed. In some embodiments, the functionality of electronic device 210 (FIGS. 2 and 3), server 212 (FIGS. 2 and 3), system 300 (FIG. 3) and/or computer system 400 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

While financial documents were used as an illustration of the uploaded data in the preceding discussion, in other embodiments a wide variety of data and information may be uploaded, including non-financial data and information.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for initially associating uploaded data with a device and subsequently with an account, the method comprising:
   receiving data from a first electronic device, wherein the data is received without receiving log-in credentials for the account;
   using the computer, determining a first identifier for the first electronic device based on characteristics of the first electronic device;
   storing the data and the first identifier;
   at a later time, receiving the log-in credentials for the account from a second electronic device, wherein the received log-in credentials are not associated with the received data;
   using the computer, determining a second identifier for the second electronic device based on characteristics of the second electronic device;
   comparing the first identifier with the second identifier to determine a match; and
   subsequent to determining a match between the first identifier and the second identifier, establishing an association between the received data and the account.

2. The method of claim 1, wherein the data includes one of: an image of a financial document; sales information; and an image of a receipt.

3. The method of claim 1, wherein the characteristics of at least one of the first electronic device and the second electronic device, include at least one of: a type of web browser, a web-browser plugin, an ability to accept location headers in the web browser, a time zone, a screen size, a color depth, a system font, an ability to accept cookies, and a super-cookie test.

4. The method of claim 1, wherein, after storing the data and the first identifier and before receiving the log-in credentials, the method further comprises creating the account.

5. The method of claim 1, wherein the account is a pre-existing account.

6. The method of claim 1, wherein the method further comprises using the data in an application associated with the account.

7. The method of claim 1, wherein the data is received over time.

8. A computer-program product for use in conjunction with a computer system, the computer-program product comprising a non-transitory computer-readable storage medium and a computer-program mechanism embedded therein to initially associate uploaded data with a device and subsequently with an account, the computer-program mechanism including:
   instructions for receiving data from a first electronic device, wherein the data is received without receiving log-in credentials for the account;
   instructions for determining a first identifier for the first electronic device based on characteristics of the first electronic device;
   instructions for storing the data and the first identifier;

instructions for receiving, at a later time, the log-in credentials for the account from a second electronic device, wherein the received log-in credentials are not associated with the received data;

instructions for determining a second identifier for the second electronic device based on characteristics of the second electronic device;

instructions for comparing the first identifier with the second identifier to determine a match; and subsequent to determining a match between the first identifier and the second identifier, instructions for establishing an association between the data with the account.

9. The computer-program product of claim 8, wherein the data includes one of: an image of a financial document; sales information; and an image of a receipt.

10. The computer-program product of claim 8, wherein the characteristics of at least one of the first electronic device and the second electronic device, include at least one of: a type of web browser, a web-browser plugin, an ability to accept location headers in the web browser, a time zone, a screen size, a color depth, a system font, an ability to accept cookies, and a super-cookie test.

11. The computer-program product of claim 8, wherein, after storing the data and the first identifier and before receiving the log-in credentials, the computer-program product further comprises instructions for creating the account.

12. The computer-program product of claim 8, wherein the account is a pre-existing account.

13. The computer-program product of claim 8, wherein the computer-program product further comprises instructions for using the data in an application associated with the account.

14. The computer-program product of claim 8, wherein the data is received over time.

15. A computer system, comprising:

a processor;

memory; and a program module, wherein the program module is stored in the memory and configurable to be executed by the processor to initially associate data with a device and subsequently with an account, the program module including:

instructions for receiving data from a first electronic device, wherein the data is received without receiving log-in credentials for the account;

instructions for determining a first identifier for the first electronic device based on characteristics of the first electronic device;

instructions for storing the data and the first identifier;

instructions for receiving, at a later time, the log-in credentials for the account from a second electronic device, wherein the received log-in credentials are not associated with the received data;

instructions for determining a second identifier for the second electronic device based on characteristics of the second electronic device;

instructions for comparing the first identifier with the second identifier to determine a match; and subsequent to determining a match between the first identifier and the second identifier match, instructions for establishing an association between the data with the account.

16. The computer system of claim 15, wherein the data includes one of: an image of a financial document; sales information; and an image of a receipt.

17. The computer system of claim 15, wherein the characteristics of at least one of the first electronic device and the second electronic device, include at least one of: a type of web browser, a web-browser plugin, an ability to accept location headers in the web browser, a time zone, a screen size, a color depth, a system font, an ability to accept cookies, and a super-cookie test.

18. The computer system of claim 15, wherein, after the instructions for storing and before the instructions for receiving, the program module further comprises instructions for creating the account.

19. The computer system of claim 15, wherein the account is a pre-existing account.

20. The computer system of claim 15, wherein the program module further comprises instructions for using the data in an application associated with the account.

* * * * *